Patented Nov. 13, 1945

2,388,663

UNITED STATES PATENT OFFICE 2,388,663

AROYLAMINONITRODIPHENYLAMINE

Christopher Stanley Argyle, Spondon, near Derby, England, assignor to British Celanese Limited, London, England, a company of Great Britain No Drawing. Application November 20, 1942, Serial No. 466,324. In Great Britain December 5, 1941

5 Claims. (Cl. 260—558)

This invention relates to improvements in the manufacture of dyes and in the colouration therewith of textile and other materials and particularly of materials containing fibres of organic derivatives of cellulose, i. e. cellulose esters of organic carboxylic acids or cellulose ethers.

It has been found that valuable colourations, particularly yellow colourations, can be produced on textile and other materials, especially materials of organic derivatives of cellulose, with the aid of aroylamino-nitro-diarylamines.

The present invention includes the manufacture of the dyes, the dyes themselves and compositions containing them together with other substances, e. g. dispersing agents, processes for the colouration of textile and other materials with the dyes and the coloured materials so obtained.

The dyes of the invention possess excellent fastness properties and, in particular, are very resistant to steaming. They are, therefore, of special value for printing and broadly for application to materials which are subsequently to be subjected to a steaming treatment. As compared with dyes of similar constitution containing acetylamide instead of aroylamino groups they are of superior fastness to aqueous treatments.

By the term aroyl is meant an acidyl radicle containing an aryl radicle. Thus the aroyl radicle can be aracyl, e. g. benzoyl, or aralkacyl, e. g. phenylacetyl. The aroylamino group can be an aroylated primary amino group e. g. benzoylamino-, or an aroylated secondary amino group, e. g. benzoylmethylamino- or other aroyl-alkyl-amino group. Advantageously the nitro group and the acidylamino group are present in different aromatic nuclei. Again it is of advantage that each of the aromatic nuclei in the dyes should contain a single benzene ring and that the nitro group should be in the ortho position to the amino group, i. e. ortho to the amino group which unites the aryl nuclei. The dyes may contain other substituents, e. g. cyano, halogen, alkyl, alkoxy, oxyalkyl, oxyalkoxy, alkylsulphone, sulphonamide, arylamino, carboxylic amide, carboxylic ester or additional nitro groups. Furthermore, the amino group which unites the two aryl radicles may be substituted by, for example, a lower alkyl group. Preferably sulphonic acid and carboxylic acid groups are absent from the dyes.

Specially noteworthy are the dyes of the general formula:

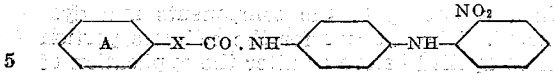

where X represents a direct linkage between nucleus A and the —CO— group, or is a —CH₂— group, and the benzene nuclei may carry alkyl, halogen or alkoxy substituents.

Examples of dyes in accordance with the invention are 2-nitro-4'-benzoylamino-diphenylamine, 4-chlor-2-nitro-4'-benzoylamino-diphenylamine, 2-nitro-4-benzoylamino-diphenylamine, 2-nitro-3'-methyl-4-benzoylaminodiphenylamine, N-(2-nitro-4-benzoylaminophenyl)-1-naphthylamine and the analogues of these compounds wherein the benzoyl radicle is replaced by m-chlorbenzoyl-, p-methylbenzoyl-, p-methoxy benzoyl- or phenylacetyl.

The dyes of the invention are obtainable by aroylating an appropriate aminonitrodiarylamine with, for instance, the appropriate acid chloride or anhydride. For example, 2-nitro-4'-amino diphenylamine may be reacted with benzoyl chloride or with phenyl-acetyl chloride. Again, an appropriate aroylamino-diarylamine may be nitrated although this method is not generally so convenient.

An alternative procedure for the preparation of the dyes of the invention involves the condensation of two appropriately substituted aromatic components. For example, a primary arylamine or a monoaryl-monoalkyl secondary amine can be condensed with an aryl compound carrying, as a substituent in an aryl nucleus, an atom or group (e. g. a reactive halogen atom, hydroxyl group, or nitro group) capable of reacting with the primary or secondary amino group of the first mentioned compound with production of a diarylamine or a diaryl-alkyl-amine as the case may be. In such cases one at least of the components must contain an aroylamino group and one at least of the components must contain a nitro group. Thus an appropriate aryl halide may be condensed with an appropriate arylamine, and particularly an o-chlor-nitro-benzene with a monoaroylated-p-phenylene-diamine; e. g. o-chlornitrobenzene can be reacted with monobenzoyl-p-phenylenediamine to produce the 2-nitro-4'-benzoylaminodiphenylamine.

The new dyes can be applied to cellulose ester or ether materials in the form of aqueous dispersions or solutions in organic solvents. Bath methods can be employed, that is to say methods in which the materials are allowed to absorb the dye from a dispersion or solution of the latter in which they are immersed. Again mechanical impregnation methods can be used, the materials being impregnated with a solution or suspension of the requisite amount of the dye. The mechanically impregnated material can then be aged or steamed to cause the dye to enter the cellulose ester or ether material.

Those dyes of the present invention which are free from sulpho and carboxy groups have substantive affinity for cellulose esters or ethers but in general substantially no affinity for cellulose or animal fibres. If, therefore, such a dye is applied to mixed materials containing both cellulose, e. g. cotton or regenerated cellulose, and a cellulose ester or ether, the latter alone takes up the dye and the cellulose component of the material remains uncoloured. By suitably colouring the cellulose component of such mixed material with dyestuffs resisting the cellulose ester or ether component of the materials, solid shades or two colour effects can readily be obtained according to the components and dyes selected. The dyestuff for the cellulose portion can be applied before or after the application of the dye for the cellulose ester or ether portion.

The new dyes are also of value for colouring cellulose ester or ether solutions, especially lacquers and spinning solutions. By shaping and setting such coloured solutions in the form of fibres, straws, films and the like, valuable coloured products can be produced. For example, coloured cellulose acetate filaments can be produced by dry spinning such coloured solutions.

The invention, so far as it relates to the colouration of materials, is particularly concerned with the production of coloured cellulose acetate products. The new dyes may, however, be used for the production of coloured products of other cellulose esters, for example cellulose formate, propionate, butyrate or acetate-butyrate, or of cellulose ethers, for example methyl, ethyl or benzyl cellulose. Further, they can be used for the colouring of materials formed from synthetic linear polymers, e. g. superpolyamide textile materials.

The following examples illustrate the invention:

Example I

*Preparation of 2-nitro-4'-benzoylamino-diphenylamine*

A well stirred mixture of 40 parts of orthonitrochlorbenzene, 100 parts of monobenzoylparaphenylene diamine and 20 parts of soda ash are heated in an oil bath at 150–160° C. for 40 hours. After cooling, the melt is poured into 1000 parts of boiling methylated spirits and precipitated by pouring into 2000 parts of water at 70–80° C. with stirring. The dyestuff is filtered off and washed with hot water to remove excess monobenzoylparaphenylene diamine. The product dyes cellulose acetate bright golden yellow shades.

Example II

*Preparation of 2-nitro-4'-(phenylacetylamino)-diphenylamine*

The above compound is prepared by condensing phenyl acetyl chloride (from phenyl acetic acid and thionyl chloride) and 2-nitro-4'-aminodiphenylamine, conveniently prepared by acid hydrolysis of the corresponding acetyl compound.

230 parts by weight of 2-nitro-4'-amino-diphenylamine are dissolved in 1250 parts of benzene and 155 parts of phenyl acetyl chloride added. The whole is refluxed for 6 hrs. and then allowed to crystallise. The product is filtered off and dried. Dyed on to cellulose acetate it gives golden yellow shades of good fastness to washing and light.

Example III

*Application of 2-nitro-4'-benzoylamino-diphenylamine to cellulose acetate*

10 parts of a finely milled aqueous paste of 2-nitro-4'-benzoylamino-diphenylamine of 10% strength are dispersed in the normal manner by heating with 3 parts of Turkey red oil and diluting with boiling 0.25% soap solution, and then adding to a dyebath containing 4000 parts of 0.25 gm. p. l. soap solution.

100 parts of cellulose acetate fabric are now introduced and the temperature raised to 70–80° C. at which temperature the material is processed for 1½ hrs. The goods are then washed off, hydroextracted and dried. The shade thus obtained is a bright golden yellow of excellent fastness to light and laundering.

Having described my invention what I desire to secure by Letters Patent is:

1. An aroylamino-ortho-nitro-diphenylamine of which the aroyl radicle is selected from the group consisting of radicles of the formula $C_6H_5X-CO-$, wherein X represents a linkage selected from the group consisting of the direct linkage and $-CH_2-$, and the nuclear substitution products of radicles of said formula wherein the nuclear substituents are selected from the group consisting of alkyl, halogen and alkoxy.

2. An aroylamino-nitro-diarylamine selected from the group consisting of compounds of the formula

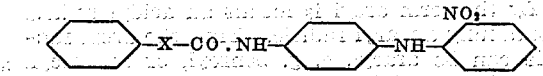

wherein X represents a linkage selected from the group consisting of the direct linkage and $-CH_2-$, and the nuclear substitution products of compounds of the said formula wherein the said nuclear substituents are selected from the group consisting of alkyl, halogen and alkoxy.

3. 2-nitro-4'-benzoylamino-diphenylamine.

4. 2-nitro-4'-(phenylacetylamino)-diphenylamine.

5. 4-chlor-2-nitro-4'-benzoylamino-diphenylamine.

CHRISTOPHER STANLEY ARGYLE.

CERTIFICATE OF CORRECTION.

Patent No. 2,388,663.                                                    November 13, 1945.

CHRISTOPHER STANLEY ARGYLE.

It is hereby certified that error appears in the printed specification of the above numbered patent requiring correction as follows: Page 1, first column, line 26, for "acetylamide" read --acetylamino--; and second column, line 14, for "methyl-4" read --methyl-4'--; and that the said Letters Patent should be read with this correction therein that the same may conform to the record of the case in the Patent Office.

Signed and sealed this 29th day of January, A. D. 1946.

Leslie Frazer (Seal)

First Assistant Commissioner of Patents.